(12) United States Patent
Yamamoto et al.

(10) Patent No.: US 9,670,815 B2
(45) Date of Patent: Jun. 6, 2017

(54) CATALYTIC CONVERTER

(71) Applicant: FUTABA INDUSTRIAL CO., LTD., Okazaki-shi, Aichi (JP)

(72) Inventors: Akira Yamamoto, Okazaki (JP); Satoshi Ito, Okazaki (JP)

(73) Assignee: FUTABA INDUSTRIAL CO., LTD, Okazaki-Shi, Aichi (JP)

(*) Notice: Subject to any disclaimer, the term of this patent is extended or adjusted under 35 U.S.C. 154(b) by 0 days.

(21) Appl. No.: 14/760,358

(22) PCT Filed: Jan. 10, 2014

(86) PCT No.: PCT/JP2014/050339
§ 371 (c)(1),
(2) Date: Jul. 10, 2015

(87) PCT Pub. No.: WO2014/109390
PCT Pub. Date: Jul. 17, 2014

(65) Prior Publication Data
US 2015/0354427 A1    Dec. 10, 2015

(30) Foreign Application Priority Data

Jan. 11, 2013  (JP) .................................. 2013-003712

(51) Int. Cl.
*F01N 3/28* (2006.01)
*B01D 53/94* (2006.01)
(Continued)

(52) U.S. Cl.
CPC ........... *F01N 3/2839* (2013.01); *B01D 53/94* (2013.01); *F01N 3/2853* (2013.01);
(Continued)

(58) Field of Classification Search
USPC ........................................ 422/177, 179, 180
See application file for complete search history.

(56) References Cited

U.S. PATENT DOCUMENTS 4,002,433 A * 1/1977 Oser ..................... F01N 3/2853
                                                422/176
4,004,887 A * 1/1977 Stormont .............. F01N 3/2875
                                                422/179
(Continued)

FOREIGN PATENT DOCUMENTS

DE    4244315      3/1994
JP    2-127726    10/1990
(Continued)

OTHER PUBLICATIONS

Partial English translation of the International Search Report and Written Opinion from corresponding PCT Appln. No. PCT/JP2014/050339 dated Apr. 15, 2014.
(Continued)

*Primary Examiner* — Walter D Griffin
*Assistant Examiner* — Jelitza Perez
(74) *Attorney, Agent, or Firm* — Grossman, Tucker, Perreault & Pfleger, PLLC

(57) ABSTRACT

A catalytic converter comprises: a catalyst carrier that purifies exhaust gases from an internal combustion engine; and a catalyst housing tube that houses the catalyst carrier. The catalyst housing tube comprises: an inlet-side conical part that comprises an exhaust-gas inlet, an inner diameter of the inlet-side conical part increasing as a distance from the exhaust-gas inlet increases; a tube part that comprises the catalyst carrier arranged therein; and, an outlet-side conical part that comprises an exhaust-gas outlet, an inner diameter of the outlet-side conical part increasing as a distance from the exhaust-gas outlet increases. A conical inner tube is further provided inside the inlet-side conical part, a diameter of the conical inner tube being smaller than that of the inlet-side conical part, and, the inlet-side conical part and the (Continued)

conical inner tube form a double structure upstream of the catalyst carrier.

5 Claims, 6 Drawing Sheets

(51) Int. Cl.
 *F01N 13/14* (2010.01)
 *F01N 13/18* (2010.01)
(52) U.S. Cl.
 CPC ....... *F01N 13/141* (2013.01); *F01N 13/1827* (2013.01); *F01N 2260/08* (2013.01)

(56) References Cited

U.S. PATENT DOCUMENTS

| | | | |
|---|---|---|---|
| 5,782,089 | A | 7/1998 | Machida et al. |
| 6,128,821 | A * | 10/2000 | Grescher ............. B01D 53/945 29/446 |
| 6,942,838 | B1 | 9/2005 | Morishita |

FOREIGN PATENT DOCUMENTS

| | | |
|---|---|---|
| JP | 8-200050 | 8/1996 |
| JP | 2957163 | 10/1999 |
| JP | 2002-256864 | 9/2002 |
| JP | 2003-531994 | 10/2003 |
| JP | 2004-162570 | 6/2004 |
| JP | 2005-163622 | 6/2005 |
| JP | 2008-038670 | 2/2008 |

OTHER PUBLICATIONS

Partial English translation of Form PCT/IPEA/408 from corresponding PCT Appln. No. PCT/JP2014/050339 dated Feb. 3, 2015.
English Translation of Form PCT/IPEA/409 (International Preliminary Report on Patentability) from corresponding PCT Appln. No. PCT/JP2014/050339 dated Apr. 17, 2015.
International Search Report from corresponding PCT Appln. No. PCT/JP2014/050339 dated Apr. 15, 2014.
Form PCT/IPEA/408 from corresponding PCT Appln. No. PCT/JP2014/050339 dated Feb. 3, 2015.
Form PCT/IPEA/409 from corresponding PCT Appln. No. PCT/JP2014/050339 dated Apr. 17, 2015.
Office Action from related Canadian Appln. No. 2,897,729, dated May 26, 2016.
Search Report from related EPO Appln. No. 14737897.0, dated Oct. 7, 2016.
Office Action from related Japanese Appln. No. 2013-003712, dated Sep. 20, 2016. English translation attached.
Office Action from related Chinese Appln. No. 2014 8000 4574.4, issued on Nov. 28, 2016. English translation attached.
Office Action from related Japanese Appln. No. 2013-003712, issued on Feb. 7, 2017. English translation attached.

* cited by examiner

CATALYTIC CONVERTER

CROSS-REFERENCE TO RELATED APPLICATIONS

This international application claims the benefit of Japanese Patent Application No. 2013-003712 filed Jan. 11, 2013 in the Japan Patent Office, and the entire disclosure thereof is incorporated herein by reference.

TECHNICAL FIELD

The present invention relates to a catalytic converter for purifying exhaust gases discharged from an internal combustion engine of an automobile or the like.

BACKGROUND ART

A catalytic converter for purifying exhaust gases from an internal combustion engine of an automobile or the like is desired to be provided under a high-temperature condition to maintain exhaust-gas purification performance of a catalyst. For this reason, the catalytic converter comprises, for example, a heat insulating structure comprising an outer tube and an inner tube as disclosed in Patent Document 1 to enhance the heat retaining property in a housing tube where a catalyst carrier is housed.

FIG. 6 shows a schematic block diagram of a catalytic converter comprising a double tube having an outer tube and an inner tube. As shown in FIG. 6, a catalytic converter 100 comprises a cylindrical catalyst carrier 102 inside a catalyst housing tube 101 that has a tube-shape with reduced diameters at both ends. The catalyst carrier 102 is steadily held inside the catalyst housing tube 101 by the outer periphery of the catalyst carrier 102. An outer tube 104 is further provided outside the catalyst housing tube 101, the outer tube 104 having almost the same shape as the catalyst housing tube 101 and having a diameter larger than that of the catalyst housing tube 101.

As shown in FIG. 6, a heat insulating effect inside the catalyst housing tube 101 is enhanced by providing a space between the outer tube 104 and the catalyst housing tube 101; thus, a decrease in temperature inside the housing tube is reduced, and heat transfer to the outside of the housing tube is reduced.

PRIOR ART DOCUMENTS

Patent Documents

Patent Document 1: Japanese Patent No. 2957163

SUMMARY OF THE INVENTION

Problems to be Solved by the Invention

The catalytic converter 100 shown in FIG. 6 has a structure where an outer tube 104 covers the outside of the catalyst housing tube 101; thus, there is a disadvantage that the overall volume of the converter increases and the space occupied by the converter increases. The weight of the converter increases as well.

There is also a method for structuring an outer tube that covers an inner tube by integrating two half-bodies having a semicircle cross section, which resembles the outer tube 104 shown in FIG. 6 being divided into half along the X-axis direction. In this case, a structure to cover the inner tube is formed by joining the two half-bodies together by clamping or the like. Thus, there is a problem of increase in the number of components. In addition, the contact points 100a and 100b of the inner tube (the catalyst housing tube 101) and the outer tube 104 may corrode from water or salt water entering from gaps at the joints.

In one aspect of the present invention, it is desirable to provide a catalytic converter in more compact structure and with a reduced possibility of corrosion.

Means for Solving the Problems

A catalytic converter according to the present invention comprises: a catalyst carrier that purifies exhaust gases from an internal combustion engine; and, a catalyst housing tube that houses the catalyst carrier. The catalyst housing tube comprises: an inlet-side conical part that comprises an exhaust-gas inlet, an inner diameter of the inlet-side conical part increasing as a distance from the exhaust-gas inlet increases; a tube part that comprises the catalyst carrier arranged therein; and, an outlet-side conical part that comprises an exhaust-gas outlet, an inner diameter of the outlet-side conical part increasing as a distance from the exhaust-gas outlet increases. In the catalytic converter of the present invention, a conical inner tube is further provided inside the inlet-side conical part, the diameter of the conical inner tube being smaller than that of the inlet-side conical part; the inlet-side conical part and the conical inner tube form a double structure upstream of the catalyst carrier.

With the structure as described above, the heat retaining property inside the catalyst housing tube is maintained in the upstream side of the catalyst carrier; thus, it is possible to reduce a decrease in temperature inside the catalyst housing tube as well as of the exhaust gases that flow in. Therefore, the exhaust-gas purification performance of the catalyst carrier can be preserved in a favorable condition. Further, in the structure as described above, a member to maintain the heat retaining property (i.e., the conical inner tube) is provided inside the catalyst housing tube; thus, it is possible to aim at downsizing the catalytic converter in comparison with conventional structures where the outer tube covers the outside of the catalyst housing tube entirely. Here, the term conical means a tube shape that has a circular cross-section, the diameter of which becomes gradually larger (or smaller) as moving from one end portion of the tube to the other end portion. The term conical also means a shape of a truncated cone.

Additionally, in the structure as described above, a heat retaining structure is formed at the exhaust-gas inlet side where the temperature of the exhaust gases needs to be preserved in a high-temperature condition. Thus, components can be downsized and an effect of reducing the cost can be obtained in comparison with the conventional structures where the outer tube covers the outside of the catalyst housing tube entirely.

A structure may comprise a conical tubular member that has a diameter larger than that of the catalyst housing tube provided on the outer periphery of the catalyst housing tube at the exhaust-gas inlet side. However, if the conical tubular member is provided outside the catalyst housing tube, a problem of corrosion may occur at gaps between the welded points of the conical tubular member and the catalyst housing tube. For this reason, every point of contact of the catalyst housing tube with the conical tubular member (that is, the entire perimeter of the catalyst housing tube) needs to be welded; thus, production cost disadvantages are caused.

By contrast, a structure such as the catalytic converter of the present invention comprises a member (that is, the conical inner tube) to maintain the heat retaining property provided inside the catalyst housing tube where water or salt water is less likely to enter. Thus, it is possible to prevent potential problems of corrosion at the gaps between the welded points when the outer periphery of the catalyst housing tube as described above is covered with a member for heat retaining. In addition, the production cost can be reduced in comparison with a structure where the conical tubular member is provided outside the catalyst housing tube.

It is preferred that the catalytic converter of the present invention comprises a space between the inner surface of the inlet-side conical part and the outer surface of the conical inner tube. In this structure, the heat insulating effect that reduces the transfer of heat from inside to outside the catalyst housing tube can be achieved.

It is preferred that a heat insulator is provided in the space in the catalytic converter of the present invention. Such structure can further enhance the heat insulating effect.

EXPLANATION OF REFERENCE NUMERALS

10 . . . catalytic converter, 11 . . . catalyst housing tube, 11a . . . exhaust-gas inlet, 11b . . . exhaust-gas outlet, 11c . . . inlet-side conical part, 11d . . . tube part, 11e . . . outlet-side conical part, 12 . . . catalyst carrier, 13 . . . holding mat, 14 . . . conical inner tube, 14a . . . exhaust-gas inlet, 14b . . . side surface, 14c . . . tube part, 14d . . . tube part, 15 . . . clearance (space), 16 . . . heat insulator, 40 . . . catalytic converter, 41 . . . catalyst housing tube, 41a . . . exhaust-gas inlet, 41b . . . exhaust-gas outlet, 41c . . . first member (inlet-side conical part), 41d . . . second member (tube part), 41e . . . third member (outlet-side conical part), 42 . . . catalyst carrier, 43 . . . holding mat, 44 . . . conical inner tube, 45 . . . clearance (space)

MODE FOR CARRYING OUT THE INVENTION

Hereinafter, embodiments of the present invention will be explained with reference to the drawings.

Figure 1:
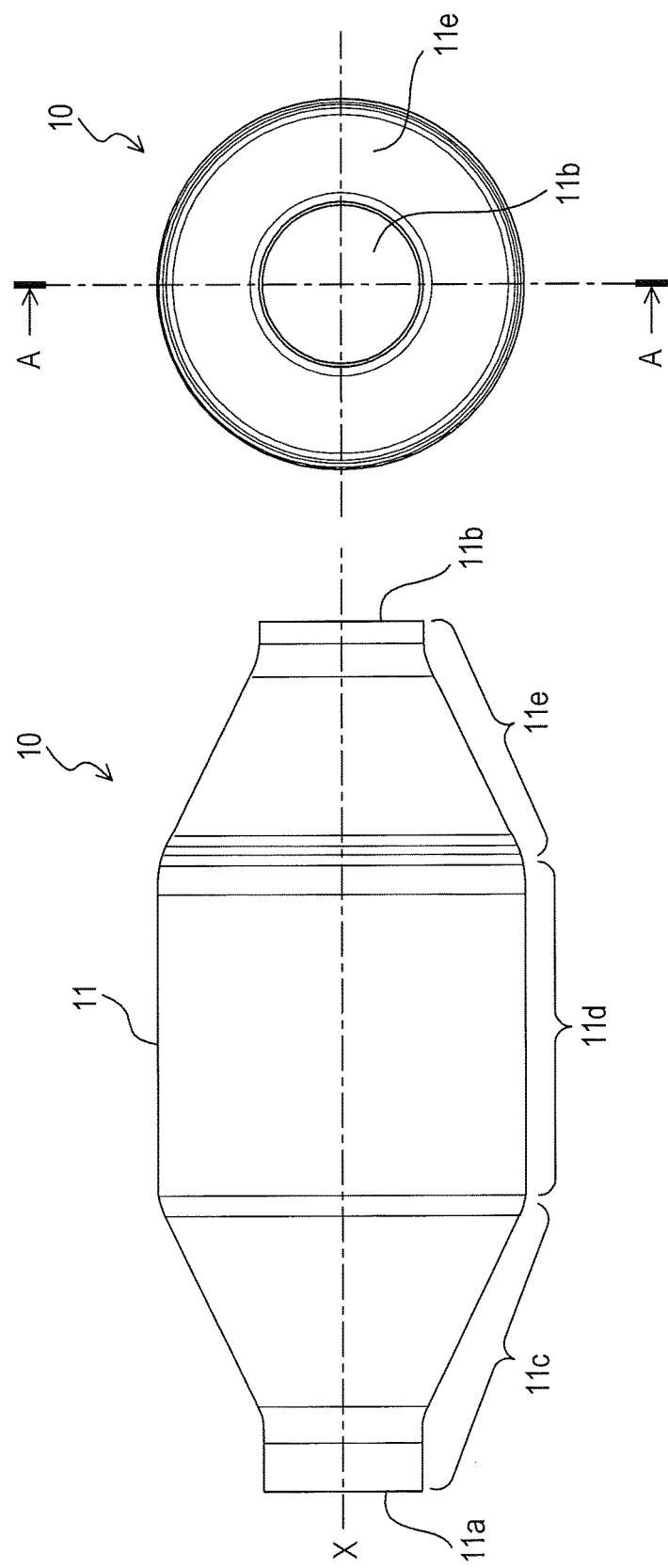
FIG. 1 is a plan view of an appearance of a catalytic converter according to one embodiment of the present invention.

FIG. 1 illustrates a catalytic converter 10 according to the present embodiment. The catalytic converter 10 is provided in an automobile, and is a device to purify exhaust gases discharged from an internal combustion engine. The shape of the catalytic converter 10 in longitudinal direction is illustrated on the left side of FIG. 1. The shape of the catalytic converter 10 as viewed from the exhaust-gas outlet 11b side is illustrated on the right side of FIG. 1.

As illustrated in FIG. 1, the catalytic converter 10 comprises a catalyst housing tube 11 that has a cylindrical shape, the diameter of which being reduced to taper the both ends; the catalyst housing tube 11 forms an outer shape of the catalytic converter 10. The catalyst housing tube 11 comprises an exhaust-gas inlet 11a at one end portion in its longitudinal direction; exhaust gases from an internal combustion engine flows into the exhaust-gas inlet 11a. The exhaust-gas outlet 11b is provided at the other end portion in the longitudinal direction of the catalyst housing tube 11; the exhaust-gas outlet 11b discharges the exhaust gases that have passed through an inside of the catalyst housing tube 11.

For convenience, the catalyst housing tube 11 can be divided into three sections by shape: an inlet-side conical part 11c, a tube part 11d, and an outlet-side conical part 11e. The inlet-side conical part 11c comprises an exhaust-gas inlet 11a at its end portion, and has a tapered shape where an inner diameter thereof increases as moving away from the exhaust-gas inlet 11a. The tube part 11d has a cylindrical shape with substantially constant inner diameter. The outlet-side conical part 11e comprises the exhaust-gas outlet 11b at its end portion, and has a tapered shape where an inner diameter thereof increases as moving away from the exhaust-gas outlet 11b.

In the present embodiment, the exhaust-gas inlet 11a and the exhaust-gas outlet 11b are both formed and structured so as to be coaxial with major parts of the cylindrically-shaped catalyst housing tube 11 and with an axis-X of a catalyst carrier 12. Nevertheless, the present invention is not limited to such a structure. The exhaust-gas inlet 11a and the exhaust-gas outlet 11b may be formed such that at least either of them is located: on an axis deviated from the axis of the major parts of the catalyst housing tube 11; or, on an axis that crosses the axis of the major parts of the catalyst housing tube 11.

Next, structures inside the catalytic converter 10 will be explained with reference to FIG. 2.

Figure 2:
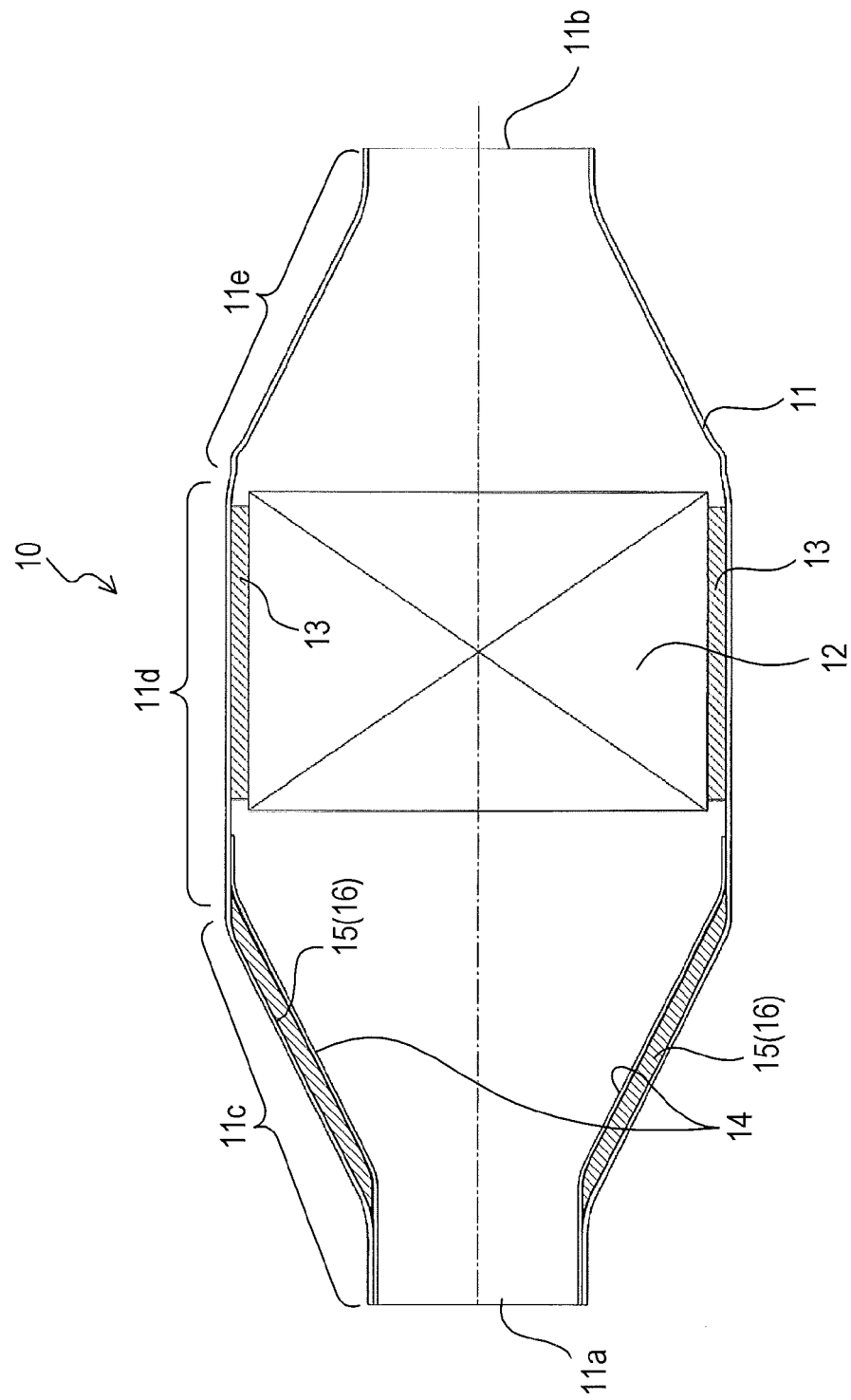
FIG. 2 is a sectional view along the line A-A of the catalytic converter illustrated in FIG. 1.

As illustrated in FIG. 2, the substantially cylindrical catalyst carrier 12 including a catalyst component is provided inside the tube part 11d of the catalyst housing tube 11. With regards to the catalyst carrier 12, a structure and a catalyst component of a conventional known catalyst carrier, which is included in a general catalytic converter, may be appropriately selected in the present invention depending on the intended use of the catalytic converter 10 without any particular limitation. A holding mat 13 that steadily holds the catalyst carrier 12 inside the catalyst housing tube 11 between the outer surface of the catalyst carrier 12 and the inner surface of the catalyst housing tube 11 is also not particularly limited in the present invention, and may be a conventional known holding mat provided in a general catalytic converter.

Figure 3:
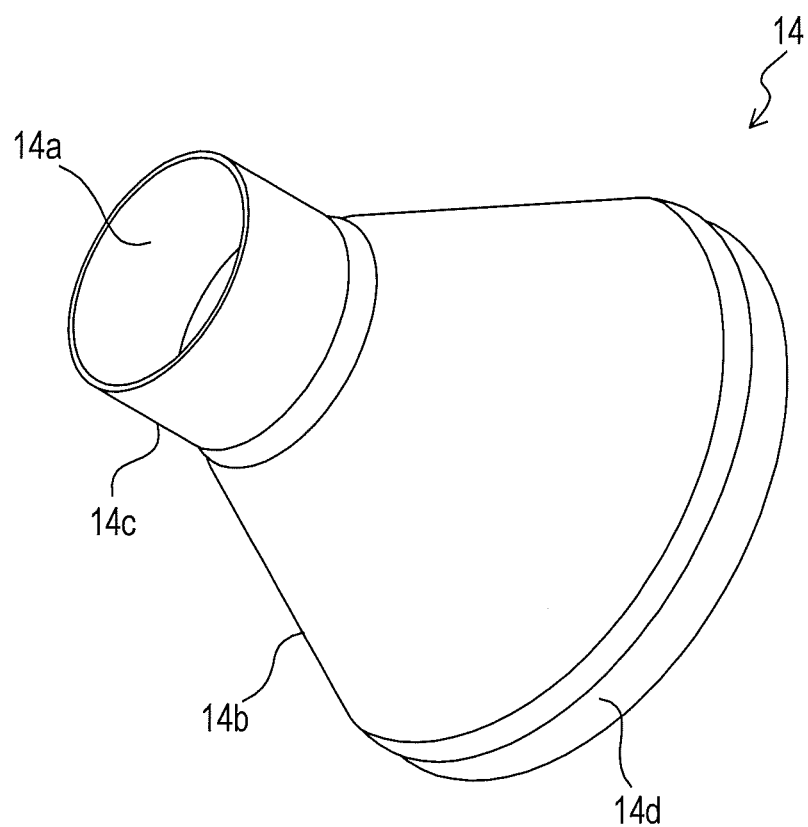
FIG. 3 is a perspective view of a conical inner tube provided in the catalytic converter illustrated in FIG. 1.

As illustrated in FIG. 2, a conical inner tube 14 that has a diameter smaller than that of the inlet-side conical part 11c is provided inside the inlet-side conical part 11c of the catalyst housing tube 11. FIG. 3 shows a shape of the conical inner tube 14. The conical inner tube 14 comprises: an exhaust-gas inlet 14a at an end portion on its side having the smaller inner diameter; and, a side surface 14b that is slanted into a tapered shape. Areas adjacent to an end portion on a smaller-diameter side and an end portion of a larger-diameter side of the side surface 14b respectively comprise tube parts 14c and 14d that have diameters different from each other.

The conical inner tube 14 has an inner diameter that is slightly smaller than that of the inlet-side conical part 11c of the catalyst housing tube 11, and has a shape approximately similar to the inlet-side conical part 11c. However, in the conical inner tube 14, inner diameters of the side surface 14b are smaller than those of corresponding areas of the inlet-side conical part 11c. Thereby, a clearance (space) 15 is provided between the side surface, slanted into a tapered shape, of the inlet-side conical part 11c and the side surface 14b of the conical inner tube 14.

As shown in FIG. 2, the conical inner tube 14 is fitted inside the inlet-side conical part 11c of the catalyst housing tube 11 such that: the outer surface of the tube part 14c is in contact with the inner surface of the inlet-side conical part 11c at the tubular tip portion; and, the outer surface of the tube part 14d is in contact with the inner surface of the tube part 11d at an area adjacent to the inlet-side conical part 11c. The contact points of the outer surfaces of the tube parts 14c and 14d with the inner surface of the catalyst housing tube 11 are fixed by welding. The welding may be spot welding performed at a number of points on the tube part; or, the welding may be performed around the entire perimeter of the tube part.

With the structure as described above, the catalytic converter 10 comprises a double structure of the inlet-side conical part 11c and the conical inner tube 14 upstream of the catalyst carrier 12 (that is, the side from which the exhaust gases flow in towards the catalyst carrier 12).

With the structure as described above, the heat retaining property inside the catalyst housing tube 11 is maintained in the upstream of the catalyst carrier 12; thus, the catalytic converter 10 in the present embodiment can reduce a decrease in temperature inside the catalyst housing tube 11 as well as of the exhaust gases that flow in. Therefore, the exhaust-gas purification performance of the catalyst carrier 12 can be preserved in a favorable condition.

In addition, the catalytic converter 10 in the present embodiment comprises the clearance 15 between the inner surface of the inlet-side conical part 11c and the outer surface of the conical inner tube 14. Thereby, the heat insulating effect that reduces heat transfer from inside to outside the catalyst housing tube 11 can also be achieved. The heat insulating effect can be further enhanced by providing a heat insulator 16 in the clearance 15.

Figure 6:
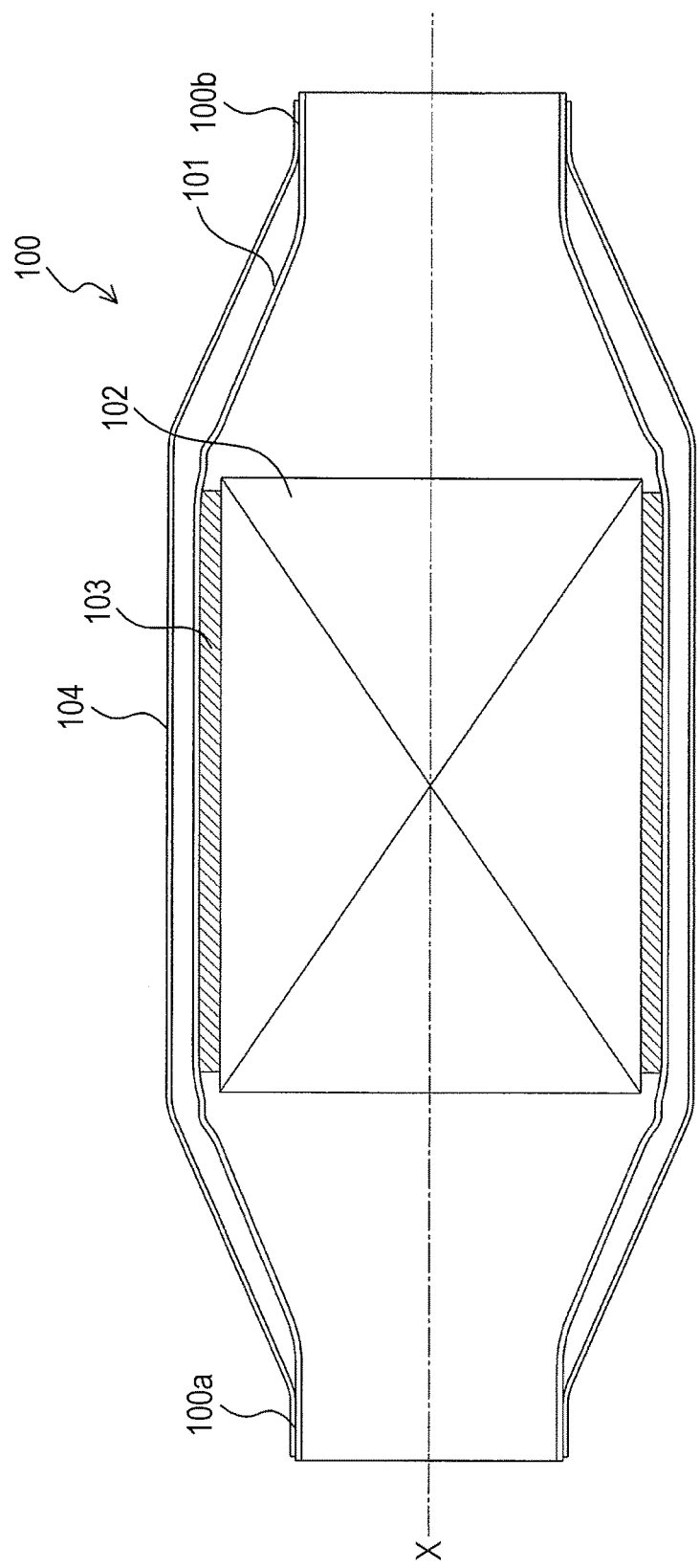
FIG. 6 is a sectional view illustrating a structure of a conventional catalytic converter.

A structure, such as the catalytic converter 10, comprising the conical inner tube 14 inside the catalyst housing tube 11 can be made compact in comparison with a structure, as illustrated in FIG. 6, where the outer tube 104 covers the outside of the catalyst housing tube 101.

In the catalytic converter 10, the double structure is provided only in the upstream of the catalyst carrier 12 where the heat retaining effect is required more. Thus, the conical inner tube 14 can be produced from less amount of metal material compared with the outer tube 104 of the conventional catalytic converter 100. Therefore, production cost can be reduced as a consequence.

Materials for the catalyst housing tube 11 and the conical inner tube 14 may be any metal material (e.g., stainless-steel) that is generally used for a tubular member, included in the catalytic converter, for housing a catalyst without particular limitation. Materials for the catalyst housing tube 11 and the conical inner tube 14 may be the same with each other, or different from each other.

Next, a production method of the catalytic converter 10 is explained with reference to FIG. 4A to FIG. 4D.

A method for producing the catalytic converter 10 by spinning is illustrated in FIG. 4A to FIG. 4D in the order of each process.

Figure 4:
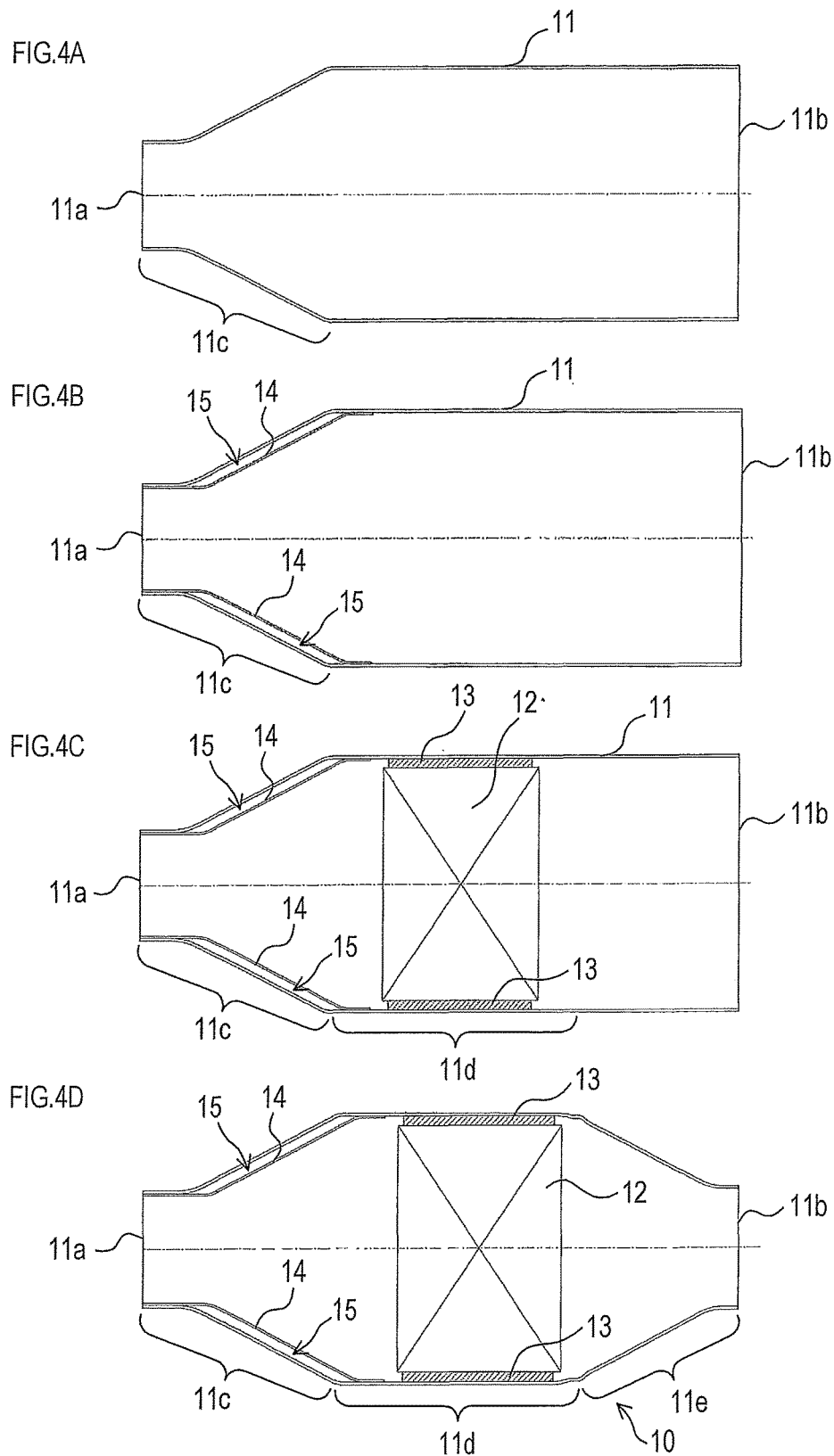
FIGS. 4A to 4D are diagrams describing a production process of the catalytic converter illustrated in FIG. 1.

First, as shown in FIG. 4A, the diameter of a tubular member, which is a base for the catalyst housing tube 11, is reduced by spinning at the exhaust-gas inlet 11a side to form the inlet-side conical part 11c.

Next, the conical inner tube 14 that is formed by press working or spinning is press fitted inside the inlet-side conical part 11c of the catalyst housing tube 11 as shown in FIG. 4B. To provide a heat insulator inside the clearance 15, the conical inner tube 14 is press fitted inside the inlet-side conical part 11c after wrapping a heat insulating mat around the outer periphery of the conical inner tube 14, for example. Next, contact points of the outer surface of the tubular portion, which is not the slanted surface, of the conical inner tube 14 with the inner surface of the catalyst housing tube 11 are fixed by performing spot welding at a number of points. This welding process may be omitted, and the conical inner tube 14 may just be press fitted inside the catalyst housing tube 11.

Next, as shown in FIG. 4C, the catalyst carrier 12 wrapped in the holding mat 13 is inserted into the catalyst housing tube 11 from the exhaust-gas outlet 11b so that the catalyst carrier 12 and the holding mat 13 are provided in the tube part 11d of the catalyst housing tube 11.

Last, as shown in FIG. 4D, the diameter of the tubular member is reduced by spinning at the exhaust-gas outlet 11b side to form the outlet-side conical part 11e.

The catalytic converter 10 is produced by the processes as described hereinbefore.

The above-mentioned production method of the catalytic converter using spinning is one example of production methods of the catalytic converter in the present invention. Without being limited to this production method, any production methods generally used to produce the catalytic converter can be appropriately adopted in the present invention. Other production methods for the catalytic converter may include press working, for example.

Next, a modification of the catalytic converter according to the present invention will be explained with reference to FIG. 5.

The catalytic converter 10 in the present embodiment comprises one tubular member to form the catalyst housing tube 11. On the contrary, as shown in FIG. 5, a catalytic converter 40 in another mode of the present invention comprises a catalyst housing tube 41 comprising three separate members: a first member 41c; a second member 41d; and, a third member 41e.

The first member 41c is a member that mainly functions as an equivalent to the inlet-side conical part, and comprises an exhaust-gas inlet 41a on its side of an end portion with a smaller diameter. A conical inner tube 44 is fitted inside the first member 41c. The conical inner tube 44 may be the same as the conical inner tube 14 in the present embodiment. The second member 41d is a member that mainly functions as an equivalent to the tube part, and houses a catalyst carrier 42 that is wrapped in a holding mat 43. The third member 41e is a member that mainly functions as an equivalent to the outlet-side conical part. The third member 41e comprises an exhaust-gas outlet 41b on its side of an end portion with a smaller diameter.

With the structure as described above, the catalytic converter 40 comprises a double structure of the first member 41c and the conical inner tube 44 upstream of the catalyst carrier 42 (that is, the side from which the exhaust gases flow in towards the catalyst carrier 42). In addition, a clearance (space) 45 is provided between the inner surface, slanted into a tapered shape, of the first member 41c and the side surface, slanted into a tapered shape, of the conical inner tube 44.

Figure 5:
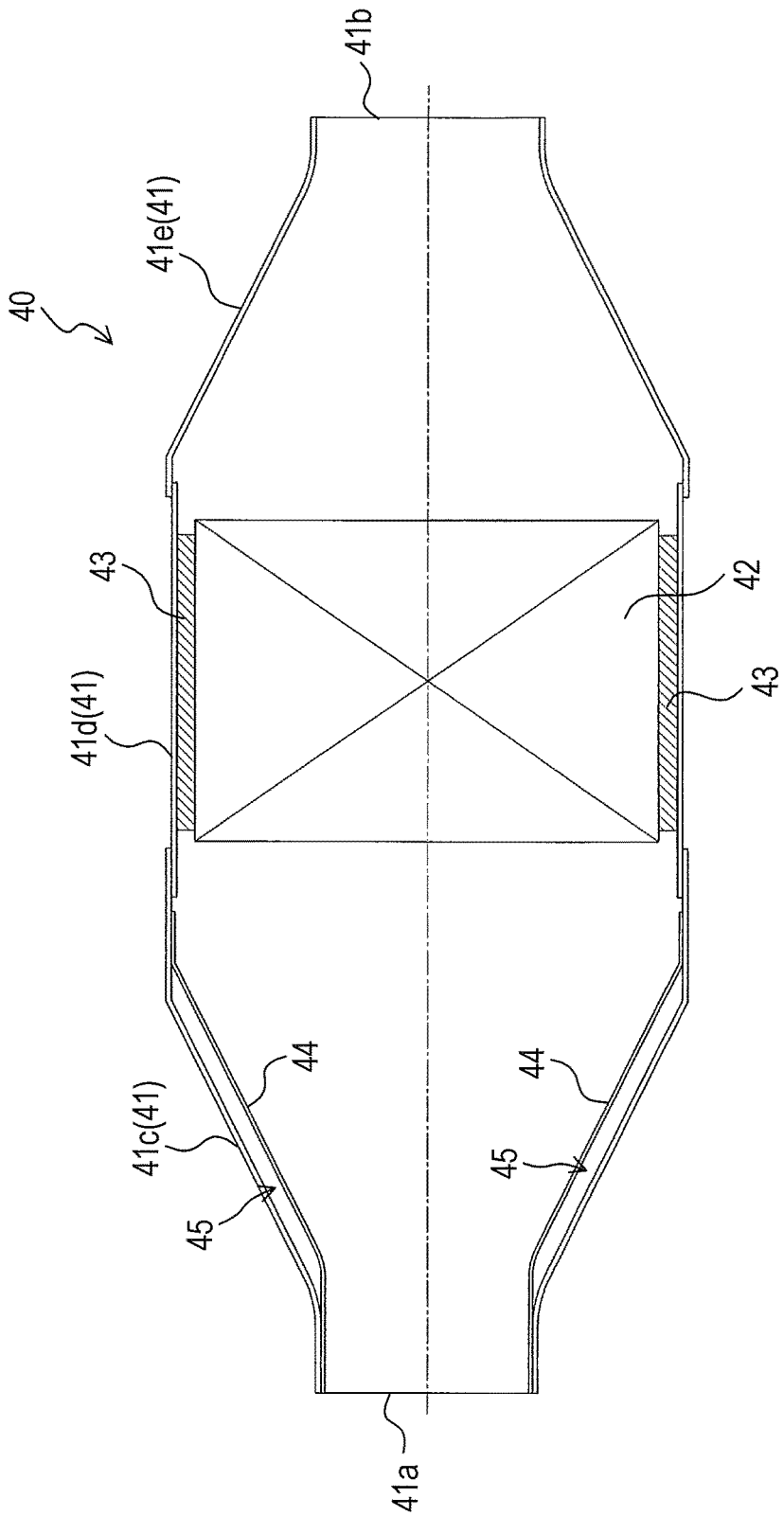
FIG. 5 is a sectional view of a modification of the catalytic converter in the present invention.

The above-mentioned spinning and other production methods such as press working and tube-making may be used when producing the three members: 41c, 41d, and 41e that forms the catalyst housing tube 41 shown in FIG. 5. To produce the catalytic converter 40 shown in FIG. 5, the three members: 41c, 41d, and 41e are formed first. Then, a member formed by fitting and welding the conical inner tube 44 inside the first member 41c, and a member formed by fitting the catalyst carrier 42, which is wrapped in the holding mat 43, inside the second member 41d are each produced. Then, the three members: 41c, 41d, and 41e are joined to each other by welding. The catalytic converter 40 can be produced by such production process.

The above are explanations of examples of embodiments of the present invention. Nevertheless, the present invention is not limited to any of the embodiments as described above, and can be carried out in various modes within the scope consistent with the spirit of the present invention. Additionally, any structure that is obtained by appropriately combining different modes is within the scope of the present invention.

What is claimed is:

1. A catalytic converter comprising:
    a catalyst carrier that purifies exhaust gases from an internal combustion engine; and
    a catalyst housing tube that houses the catalyst carrier, wherein the catalyst housing tube comprises:
        an inlet-side conical part that comprises an exhaust-gas inlet and a side surface, the side surface being slanted in such a manner that an inner diameter of the inlet-side conical part increasing as a distance from the exhaust-gas inlet increases;
        a tube part that comprises the catalyst carrier arranged therein; and
        an outlet-side conical part that comprises an exhaust-gas outlet and a side surface, the side surface being slanted in such a manner that an inner diameter of the outlet-side conical part increasing as a distance from the exhaust-gas outlet increases,
    wherein a conical inner tube is further provided inside the inlet-side conical part, a diameter of the conical inner tube being smaller than that of the inlet-side conical part,
    wherein the inlet-side conical part and the conical inner tube form a double structure upstream of the catalyst carrier, and
    wherein the catalyst carrier is provided closer to the side surface of the outlet-side conical part than the side surface of the inlet-side conical part.

2. The catalytic converter according to claim 1, wherein a space is provided between an inner surface of the inlet-side conical part and an outer surface of the conical inner tube.

3. The catalytic converter according to claim 2, wherein a heat insulator is provided in the space.

4. The catalytic converter according to claim 1, wherein the conical inner tube comprises:
    a side surface slanted into a tapered shape;
    a first tube part that is adjacent to an end portion of the side surface at a smaller-diameter side; and
    a second tube part that is adjacent to an end portion of the side surface at a larger-diameter side.

5. The catalytic converter according to claim 1, wherein the conical inner tube comprises a shape similar to a shape of the inlet-side conical part.

* * * * *